(12) United States Patent
Brown

(10) Patent No.: US 6,701,252 B2
(45) Date of Patent: Mar. 2, 2004

(54) SYSTEM FOR UNDERWATER GPS NAVIGATION

(76) Inventor: Richard Ivan Brown, 2335 Peachtree La., Northbrook, IL (US) 60062

( * ) Notice: Subject to any disclaimer, the term of this patent is extended or adjusted under 35 U.S.C. 154(b) by 0 days.

(21) Appl. No.: 10/047,643

(22) Filed: Jan. 15, 2002

(65) Prior Publication Data

US 2003/0135326 A1 Jul. 17, 2003

(51) Int. Cl.$^7$ .................. G01C 21/26; G01C 21/28; G01C 21/34; G01C 21/36
(52) U.S. Cl. .................. 701/213; 701/21; 701/200; 701/206; 701/207; 701/208; 701/213; 701/217; 701/224; 342/357.03; 342/357.66; 342/357.14; 367/90; 367/131; 440/84
(58) Field of Search .................. 701/200, 206, 701/207, 208, 213, 21, 224, 217; 342/357.06, 357.14, 357.03; 367/90, 131, 6, 3, 134, 133; 440/84; 405/167, 168.4; 441/2, 11

(56) References Cited

U.S. PATENT DOCUMENTS

| 3,668,878 | A | * | 6/1972 | Jones et al. .................. 405/167 |
| 5,331,602 | A | | 7/1994 | McLaren .................. 367/6 |
| 5,406,294 | A | * | 4/1995 | Silvey et al. .................. 343/709 |
| 5,514,843 | A | * | 5/1996 | Wilfong et al. .................. 200/5 R |
| 5,579,285 | A | * | 11/1996 | Hubert .................. 367/133 |
| 5,798,733 | A | * | 8/1998 | Ethridge .................. 701/213 |
| 5,910,789 | A | * | 6/1999 | Vigen .................. 342/357.03 |
| 6,058,071 | A | * | 5/2000 | Woodall et al. .................. 367/3 |
| 6,163,503 | A | * | 12/2000 | Gudbjornsson .................. 367/6 |
| 6,261,142 | B1 | * | 7/2001 | Fiotakis .................. 441/11 |
| 6,273,771 | B1 | * | 8/2001 | Buckley et al. .................. 440/84 |
| 6,282,151 | B1 | * | 8/2001 | Brumley et al. .................. 367/90 |
| 6,317,388 | B1 | * | 11/2001 | Woodsum et al. .................. 367/131 |
| 2002/0018400 | A1 | * | 2/2002 | Brumley et al. .................. 367/90 |
| 2002/0140599 | A1 | * | 10/2002 | King .................. 342/357.06 |
| 2003/0078706 | A1 | * | 4/2003 | Larsen .................. 701/21 |

OTHER PUBLICATIONS

Frisk et al., Modal mapping in shallow water using synthetic aperture horizontal arrays, 2000, IEEE, pp. 185–188.*
Kurano et al., The study of the float buoy ranging system for the underwater vehicle, 161–166.*
Bahlavouni et al., Ice penetrating communication buoy for underwater vehicles operatin in teh arctic, 2001, IIEEE, pp. 1500–1503.*

* cited by examiner

Primary Examiner—William A. Cuchlinski, Jr.
Assistant Examiner—McDieunel Marc

(57) ABSTRACT

Provided is a system that allows navigation by GPS while underwater by locating the antenna above water and the display below water. In one embodiment, the GPS antenna is attached to a tow-able buoy having a diver-down flag. In another embodiment, the GPS antenna is carried by the diver and released to float to the surface when the diver wishes to navigate. A preferred embodiment uses a handheld computer to display GPS data, and can be expanded to also calculate and display depth and decompression data, and to provide for further expansion and integration to include other devices.

17 Claims, 4 Drawing Sheets

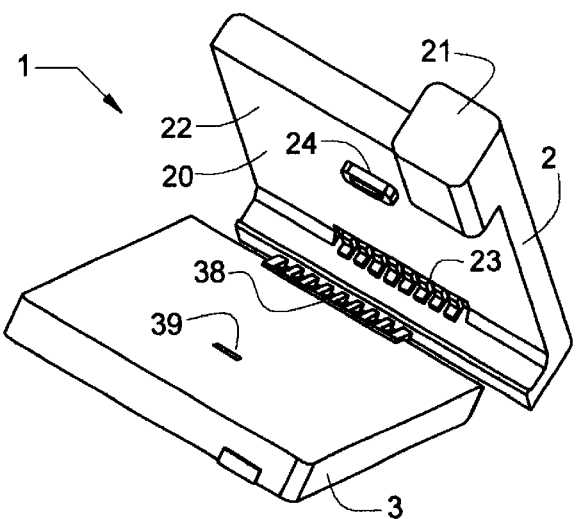
FIG. 1
PRIOR ART
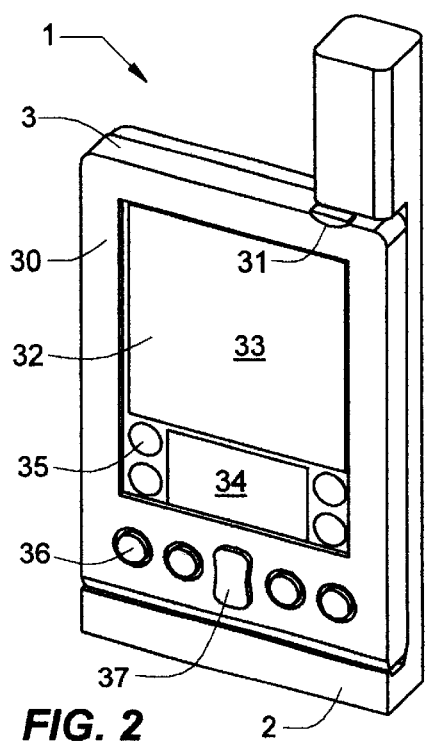
FIG. 2
PRIOR ART
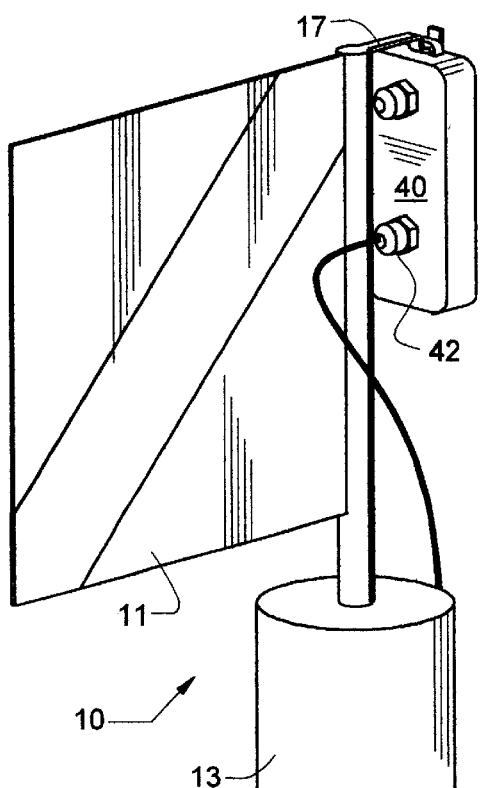
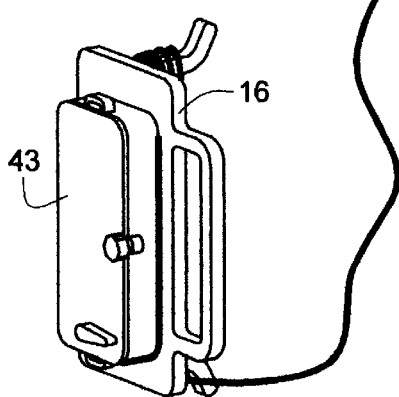
FIG. 3

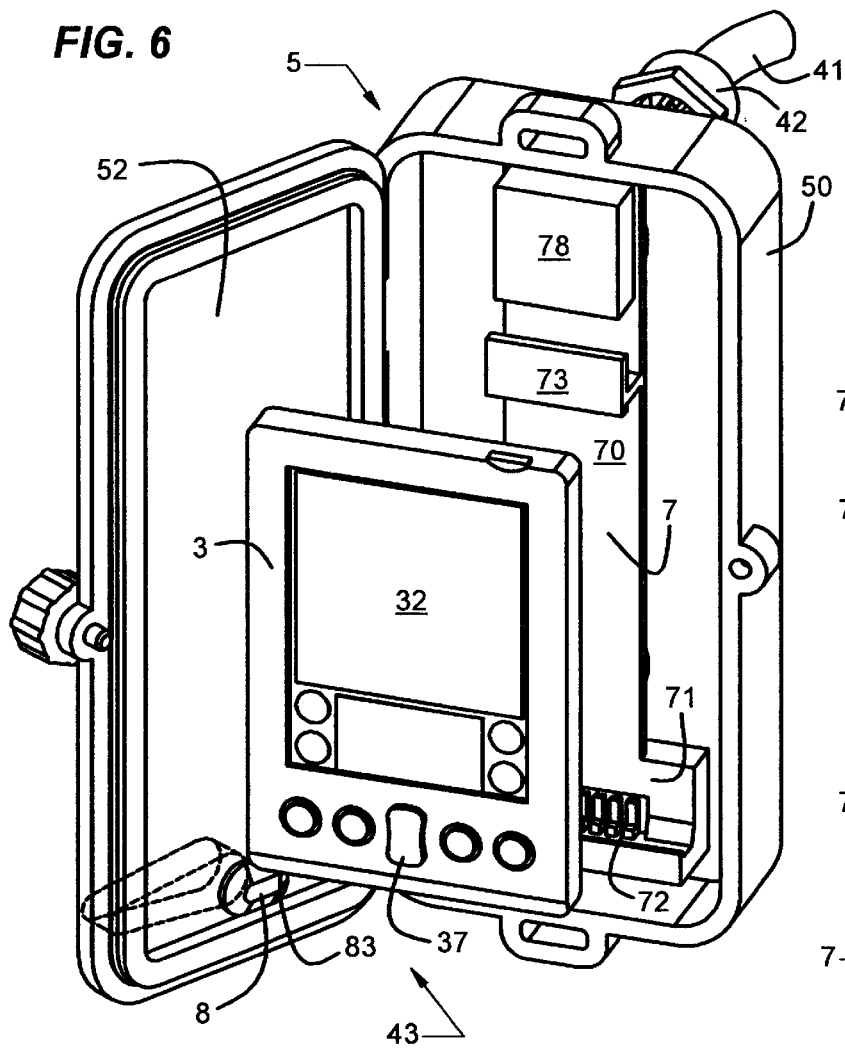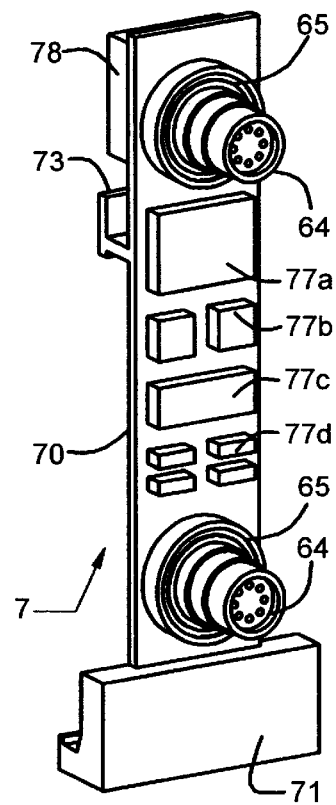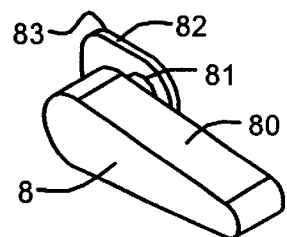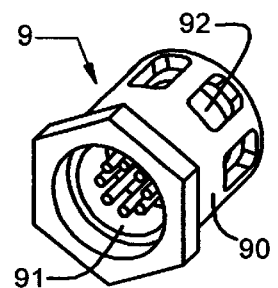

SYSTEM FOR UNDERWATER GPS NAVIGATION

FIELD OF THE INVENTION

The present invention relates to the field of instrumentation used by scuba divers and, more particularly, to satellite based global positioning systems adapted for use by divers for use while underwater and integrated into the diver's array of instrumentation.

BACKGROUND OF THE INVENTION

Recreational diving has undergone a remarkable transformation over the years. In its infancy, a diver would simply strap on an air tank, depth gauge, watch, and compass, and venture off underwater. Interest in photography, marine biology, archeology, treasure hunting, and wreck diving drew millions of people underwater and led to the development of underwater still and video cameras, sonar-based ranging systems, and computer-based decompression gauges.

But methods for navigating while underwater remain primitive at best. Some divers simply surface to get their bearings, but this practice can be dangerous in areas with heavy marine traffic, or if decompression is needed. Moreover, visual sightings can sometimes be difficult to acquire at night, or in fog or rough seas. Still other divers count kick strokes along a compass heading and plot vectors on an underwater slate. But this method is cumbersome and inconvenient, and usually not very accurate, especially if currents and tides are present.

An extraordinary development in navigation is that of the satellite based global positioning system (GPS). GPS allows navigation with an accuracy to within a few meters and would provide an outstanding navigation system for divers. Unfortunately, GPS signals do not travel through water and, thus, GPS has not been directly used underwater.

So there is a need for a navigational system that can be used by a diver while underwater. It would be particularly advantageous if such a system were affordable to the average diver and would integrate into the assortment of instrumentation now used by divers.

SUMMARY OF THE INVENTION

It is an object of the present invention to provide a diver with means to determine his or her position while underwater.

It is still another object of the present invention to provide a diver with an affordable means to navigate while underwater.

It is still yet another object of the present invention to provide a diver with means to integrate GPS navigation into other instrumentation.

The present invention meets its objectives by providing a GPS system wherein the GPS antenna is above water while the navigational display is below water. In one embodiment, the GPS antenna is carried on a tow-able buoy having a diver-down flag. In another embodiment, the GPS antenna is carried by the diver and released to float to the surface when the diver wishes navigation data. In a preferred embodiment, a handheld computer not only provides an underwater GPS graphics display, but also calculates decompression information and manages data in an integrated fashion.

Further characteristics and advantages will become apparent from a description of the preferred embodiments given hereinafter.

BRIEF DESCRIPTION OF THE DRAWINGS

FIG. 1 is a exploded view of a prior art GPS system.

FIG. 2 is a perspective view of the prior art GPS system of FIG. 1 shown in an assembled state.

FIG. 3 is a perspective view of one embodiment of an underwater GPS system of the present invention.

FIG. 6 is a partially exploded view of a waterproof GPS display enclosure suitable for use in the present invention.

FIG. 7 is a perspective view of the PDA adapter of FIG. 7.

FIG. 8 is a perspective view of a control lever suitable for use with the GPS display enclosure of FIG. 6.

FIG. 9 is a perspective view of a pressure transducer suitable for use in the present invention.

DETAILED DESCRIPTION OF THE INVENTION

Figure 4:
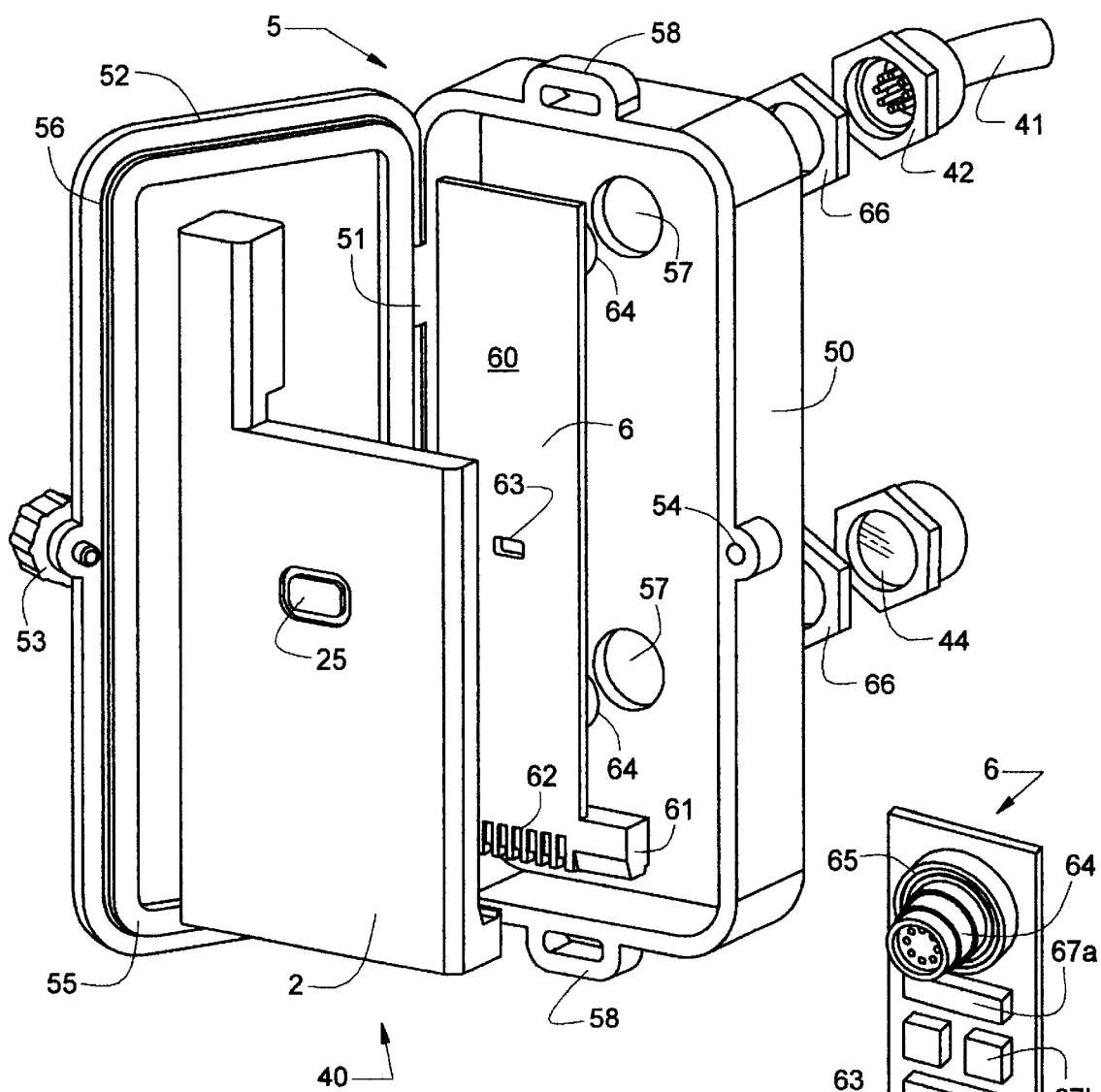
FIG. 4 is a partially exploded view of a waterproof GPS antenna enclosure suitable for use in the present invention.

Originally designed for military use, the satellite-based GPS navigation system has been made available to the public and is now used by pilots, sailors, and outdoorsmen. FIG. 1 depicts prior art GPS system 1 wherein GPS receiver 2 is adapted for use by handheld computer type personal data assistant PDA 3. GPS receiver 2 is a GPS Companion™ marketed by Magellan Corp., San Dimas, Calif. PDA 3 is a Palm V Organizer™ marketed by Palm Computing, Inc., Santa Clara, Calif. GPS receiver 2 comprises housing 20 containing antenna 21 and processing circuitry 22 (not visible). GPS receiver 2 also includes GPS docking connector 23 to receive PDA connector 38 and further includes latching element 24 to mate with and lock to PDA slot 39. PDA 3 is detachably attachable to GPS receiver 2 with PDA connector 38 coupled to GPS docking connector 23.

When coupled to GPS receiver 2, PDA 3 can be used to further process and subsequently display navigation data transmitted by GPS receiver 2. Referring now to FIG. 2, PDA 3 comprises PDA housing 30 having on/off switch 31 and graphics display screen 32. Display field 33 can present both textual and graphical information. Stylus activated input field 34 and virtual buttons 35 can be used to input data. In addition, one or more manually operated hard-wired buttons 36 are available along with manually operated rocker switch 37. When used with GPS receiver 2, rocker switch 37 can be used to page through the various navigation display screens available through PDA programs screens (not shown).

GPS system 1 provides accurate navigation data for the user, but it is not waterproof and cannot be submerged without incurring serious damage. It can be housed in a waterproof case to protect it from water, but, even so, still cannot be used underwater because GPS signals do not penetrate very far beneath the surface.

FIG. 3 depicts an illustrative embodiment of underwater GPS system 4 suitable for use by a diver while underwater. Underwater GPS system 4 comprises buoy 10, GPS antenna enclosure 40, and GPS display enclosure 43. Buoy 10 is of known construction and comprises diver-down flag 11 affixed to pole 12 mounting float 13 and weight 14. The size and weight of float 13 and weight 14 are preselected so that diver-down flag 11 remains above the surface of the water (not shown) and oriented in an upright position. Ordinarily, a diver attaches one end of a line (not shown) to eyebolt 15 and the other end to reel 16 so that he can tow buoy 10 while underwater. Excess line is wrapped around reel 16. Buoy 10 alerts boaters that a scuba diver is present and a safe distance must be maintained. Several different patterns of diver-down flag 11 are known in the art.

Pole 12 includes hook 17 to which GPS antenna enclosure 40 is attached. Waterproof cable 41 having waterproof connector 42 couples GPS antenna enclosure 40 to GPS display enclosure 43. GPS display enclosure 43 can be attached to reel 16. Waterproof cable 41 can be used to directly tow buoy 10, or a separate tow line can be used. GPS antenna enclosure 40 houses, at a minimum, an antenna specifically designed to capture GPS signals. GPS display enclosure 43 contains, at a minimum, at least one display element adapted to display navigation data.

Processing circuitry to convert GPS signal into navigation data can be housed in whole, or in part, within GPS antenna enclosure 40, GPS display enclosure 43, and/or any number of additional enclosures (not shown) distributed along waterproof cable 41. Waterproof cable 41 is not limited to conveying only electrical signals or data between the various elements of the system, but can be adapted to convey any form of energy. For instance, waterproof cable 41 could just as well be a fiber optic cable adapted to convey optical information.

The navigation data presented to a diver by GPS display enclosure 43 does not represent the diver's actual location, but the location of GPS antenna enclosure 40. Generally, the inaccuracy is of little concern as the diver is usually only interested in his approximate location. The resulting error does not adversely effect the diver's ability to determine an appropriate heading to return to his point of entry or locate some submerged point of interest. Should greater accuracy be desired, the diver can reel in excess cable to bring buoy 10 into a position directly overhead.

Occasionally, a diver may not wish to tow buoy 10. For instance, he could dive from a boat anchored near a reef and wish to explore the area unencumbered, needing navigation data only when he wishes to return to the boat. In this case, the diver can carry both GPS display enclosure 43 and GPS antenna enclosure 40 with him and allow GPS antenna enclosure 40 to float to the surface whenever he desires navigation data.

It is expected that GPS antenna enclosure 40 will be immersed from time to time, either intentionally as described above, or inadvertently if dragged beneath the surface by mistake. GPS antenna enclosure 40 should remain waterproof to a depth of at least 10 feet, and, preferably, to a depth of at least 130 feet.

FIGS. 4–8 adapt prior art GPS system 1 for use in underwater GPS system 4. It should be understood that no limitation is intended or inferred by the illustrative example. Other commercially available GPS antenna and display systems could be used or new GPS receivers and display units could be designed.

FIG. 4 is an exploded view of one embodiment of GPS antenna enclosure 40. GPS antenna enclosure 40 comprises waterproof enclosure 5, GPS adapter 6, and GPS receiver 2. Waterproof enclosure 5 comprises case 50 having hinges 51 (only one of which is visible) to retain lid 52. Lid 52 includes captive screw 53 adapted to mate with threaded hole 54 to keep lid 52 closed when in use. Lid 52 further includes boss 55 to retain O-ring 56 to form a waterproof seal between case 50 and lid 52. Case 50 further includes mounts 58 to attach GPS antenna enclosure 40 to buoy 10 as shown in FIG. 3.

GPS adapter 6 comprises printed circuit card 60 having base 61, docking connector 62, and slot 63. Slot 63 is adapted to receive latching element 24 of GPS receiver 2 (shown in FIG. 1). Base 61, docking connector 62, and slot 63 serve to mechanically and electrically couple GPS receiver 2 to GPS adapter 6. GPS receiver 2 can be released from GPS adapter 6 by operating latch release 25 in a known manner.

Figure 5:
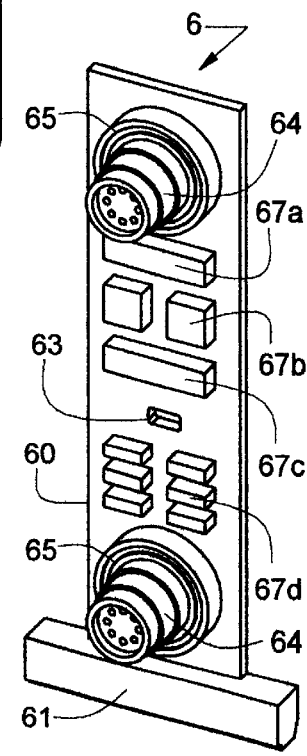
FIG. 5 is a perspective view of the GPS adapter of FIG. 4.

GPS adapter 6 further comprises electrical connectors 64 (best shown in FIG. 5). Connectors 64 pass through holes 57 of case 50 and include integral O-rings 65 to form waterproof face seals with case 50 when GPS adapter 6 is fastened to case 50 by nuts 66. Connectors 64 are in electrical communication with docking connector 62, allowing GPS receiver 2 to communicate with waterproof connector 42 and waterproof cable 41. Having two connectors 64 allows system expansion capabilities as will be discussed subsequently. Waterproof cap 44 can be used to seal any unused connectors 64, if so desired.

FIG. 6 is a partially exploded view of a preferred embodiment of GPS display enclosure 43 and comprises PDA 3, PDA adapter 7, and a second waterproof enclosure 5. Other waterproof enclosures could be designed if so desired. PDA adapter 7 comprises printed circuit card 70 having base 71, docking connector 72, and PDA latch 73. Base 71, docking connector 72, and PDA latch 73 serve to mechanically and electrically couple PDA 3 to PDA adapter 7. As best shown in FIG. 7, PDA adapter 7 further comprises electrical connectors 64 with integral O-rings 65. PDA adapter 7 attaches to and seals with case 50 in a like manner as GPS adapter 6. Connectors 64 electrically communicate with docking connector 72, allowing PDA 3 to communicate with GPS receiver 2 through waterproof cable 41 and waterproof connector 42.

Case 50 and lid 52 can be fabricated in plastic materials such as acrylic or polycarbonate by injection molding methods. The enclosure used to house antenna 21 should be transparent to GPS signals while lid 52 can be clear so that PDA graphics display screen 32 can be seen by the diver. The weight and volume of waterproof enclosure 5 can be preselected to allow GPS antenna enclosure 40 to float in water. In addition, lid 52 can further include control lever 8 to allow the diver to interact with PDA 3. Control lever 8 (best seen in FIG. 8) comprises arm 80 having shaft 81 coupled to actuator 82. When rotated by the diver, taper 83 of actuator 82 contacts and depresses rocker switch 37 of PDA 3, allowing the diver to switch between the various display screens provided by software resident in PDA 3. Control lever 8 can include an 'O'-ring (not shown) to provide a waterproof seal with lid 52. Although only one control lever 8 is shown, it should be understood than any number of external controls can be supplied. It should be further understood that other forms of external controls can also be used. For instance, watertight pushbuttons and/or knobs can also be used, or a control system could be built using magnetic and/or optical means and the like.

Thus, the diver can place GPS receiver 2 having antenna 21 into GPS antenna enclosure 40, PDA 3 having graphics display screen 32 into GPS display enclosure 43, connect waterproof cable 41 and be ready to use the system underwater. He can choose to attach GPS antenna enclosure 40 to buoy 10 and attach GPS display enclosure 43 to reel 16 as shown in FIG. 3, or he can choose to carry both GPS antenna enclosure 40 and GPS display enclosure 43 and release GPS antenna enclosure 40 to float to the surface only when a navigational fix is desired.

System Expansion Providing GPS adapter 6 and PDA adapter 7 with extra connectors 64 allows the diver to expand the system as desired. For instance, modems are available than can be connected to PDA 3 to allow telecommunications and internet access. An assembly comprising waterproof enclosure 5, GPS adapted 6, and a modem suitable for connection directly to PDA 3 can be attached to GPS antenna enclosure 40 via a second waterproof cable 41 to provide telecommunications while underwater. In addition, digital cameras and audio recorders are available to work directly with PDA 3.

GPS adapter 6 and PDA adapter 7 can include electronic components 67a–d and 77a–d respectively to provide switching, buffering, isolation, and the like to handle data synchronization and gating. PDA adapter 7 can be further equipped with auxiliary battery pack 78 to augment the capacity of the batteries in PDA 3 and to power any expansion components added to the system.

Expansion is not limited to existing components adapted for use with PDA 3. Since underwater GPS system 4 already has its own power source, computer module, display screen, and associated controls; providing increased functionality can be done very cheaply. For instance, FIG. 9 shows pressure transducer assembly 9 comprising housing 90 having connector 91 and pressure transducer 92 having integrated analog-to-digital circuitry. Pressure transducer assembly 9 connects directly to an unused connector 64 protruding from GPS display enclosure 43, and, with appropriate software or algorithms, can be used to display depth, plot dive profiles, calculate nitrogen saturation levels, and present decompression requirements information.

Other devices that can be adapted for use with GPS display enclosure 43 include keyboards, microphones, metal detectors, bar code readers, temperature sensors, salinity sensors, turbidity sensors, and ultrasonic probes.

Figure 10:
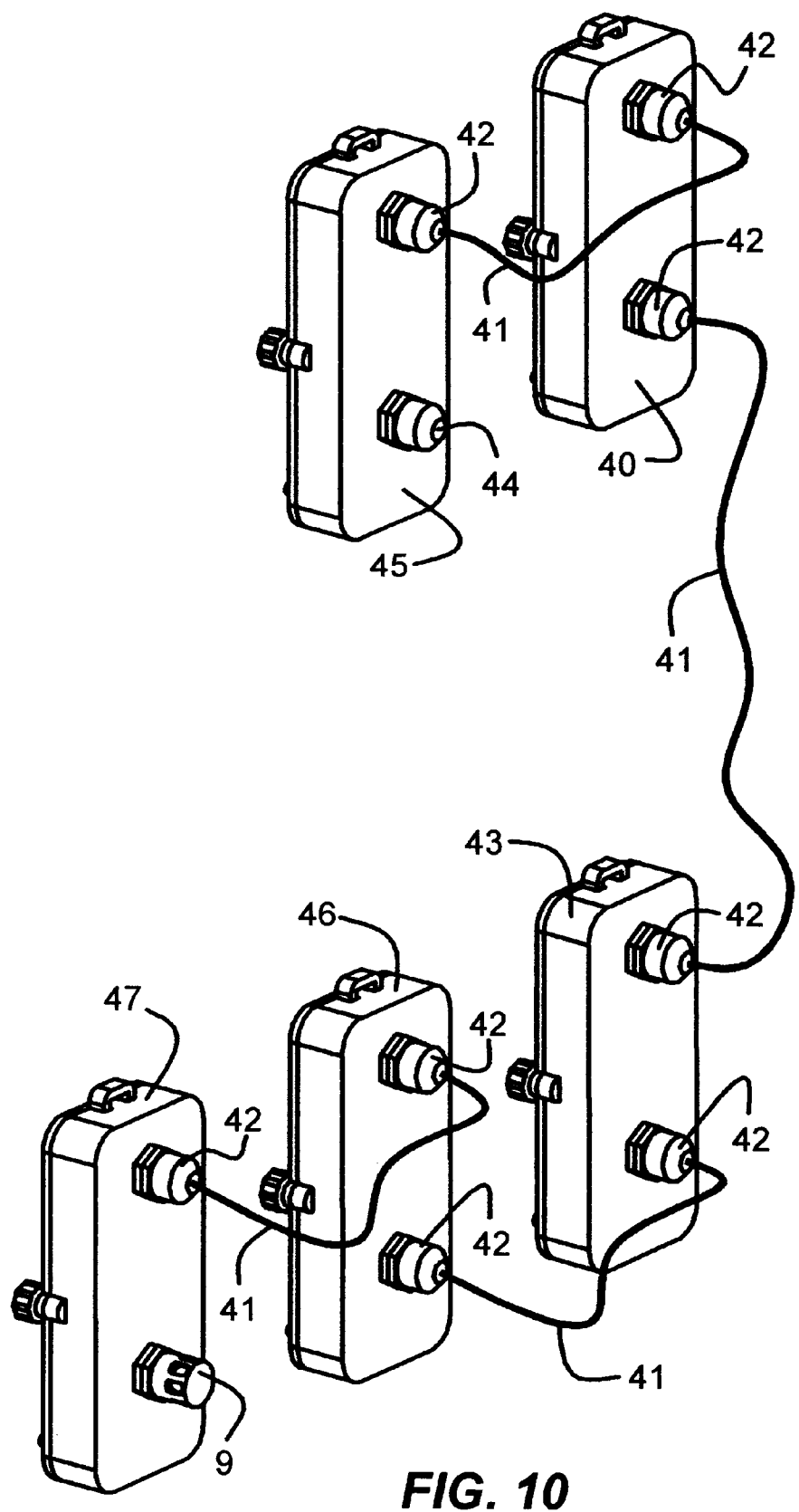
FIG. 10 is a perspective view illustrating the interconnections between multiple components of an integrated system.

FIG. 10 shows an illustrative, non-limiting example of how an array of such devices can be integrated to suit some particular purpose. For instance, a marine biologist might wish to catalogue, record, and track the fauna in a particular area. GPS display enclosure 43 is connected to GPS antenna enclosure 40 and telecommunications device assembly 45 (located above water), and to camera assembly 46 and bar-code scanner device assembly 47. All elements are interconnected through waterproof connectors 42 and waterproof cables 41. Pressure transducer assembly 9 terminates the string of underwater enclosures, while unused connectors are capped by waterproof cap 44 as shown on telecommunications device assembly 45. Thus, the biologist can photograph, tag, and record specimens while maintaining contact with others in the area or on shore. PDA 3 housed within GPS display enclosure 43 can associate any images and/or bar code scans with navigation data provided by GPS receiver 2 housed in GPS antenna enclosure 40 while monitoring the biologists decompression status.

While the present invention has been shown in what is thought to be its most practical embodiment, it will be apparent to those skilled in the art that numerous modifications can be made without departing from the novel scope of the invention. Hence, the proper scope of the present invention should be determined only by the broadest interpretation of the appended claims so as to encompass all such modifications and equivalents.

I claim:

1. A navigation system for a diver comprising:
   a handheld computer having a graphics display screen;
   a GPS receiver detachably attachable to said handheld computer for receiving GPS signals;
   a first enclosure to water-tightly receive said GPS receiver;
   a second enclosure to water-tightly receive said handheld computer and render at least a portion of said graphics display screen visible to said diver while underwater;
   a flexible conduit connected between said first enclosure and said second enclosure, for conveying information from said GPS receiver to said handheld computer; and
   a buoy having a floatation element and including a diver-down flag, said buoy to be towed by said diver and to support said first enclosure.

2. The navigation system of claim 1 further comprising a reel to receive said flexible conduit.

3. The navigation system of claim 1 further comprising a pressure transducer to convey depth information to said handheld computer.

4. The navigation system of claim 3 wherein said handheld computer displays decompression information.

5. The navigation system of claim 1 further comprising at least a third enclosure to receive a device detachably attachable to said handheld computer.

6. The navigation system of claim 5 wherein said device is selected from the group of devices comprising telecommunications equipment, cameras, audio recorders, microphones, keyboards, bar code readers, metal detectors, pressure sensors, temperature sensors, salinity sensors, turbidity sensors, and ultrasonic ranging probes.

7. The navigation system of claim 1 wherein said second enclosure further comprises at least one externally operable control member.

8. A navigation system for a diver comprising:
   an antenna to receive GPS signals;
   a processing unit to convert said GPS signals into navigation data;
   a pressure sensor adapted to measure depth;
   an algorithm to convert said depth measurement into decompression information;
   a display element to present said navigation data and said decompression information to said diver;
   a first watertight enclosure to house said antenna: and
   a second watertight enclosure to house said display element.

9. The navigation system of claim 8 further comprising a buoy having a floatation element and including a diver-down flag, said buoy to be towed by said diver and to support said antenna.

10. The navigation system of claim 8 further comprising a flexible conduit connected between said first watertight enclosure and said second watertight enclosure to convey information from said first watertight enclosure to said second watertight enclosure.

11. The navigation system of claim 8 wherein said second enclosure further comprises at least one externally operable control member.

12. A navigation system for a diver comprising:
   a handheld computer having a graphics display screen;
   a GPS receiver detachably attachable to said handheld computer for receiving GPS signals;
   a first enclosure to water-tightly receive said GPS receiver;

a second enclosure to water-tightly receive said handheld computer and render at least a portion of said graphics display screen visible to said diver while underwater; and a flexible conduit connected between said first enclosure and said second enclosure for conveying information from said GPS receiver to said handheld computer.

13. The navigation system of claim 12 further comprising a buoy having a floatation element and including a diver-down flag, said buoy to be towed by said diver and to support said first enclosure.

14. The navigation system of claim 12 further comprising a pressure transducer to convey depth information to said handheld computer.

15. The navigation system of claim 14 wherein said handheld computer displays decompression information.

16. The navigation system of claim 12 further comprising at least a third enclosure to receive a device detachably attachable to said handheld computer.

17. The navigation system of claim 16 wherein said device is selected from the group of devices comprising telecommunications equipment, cameras, audio recorders, microphones, keyboards, bar code readers, metal detectors, pressure sensors, temperature sensors, salinity sensors, turbidity sensors, and ultrasonic range probes.

* * * * *